United States Patent
Kuvaja et al.

(10) Patent No.: US 6,813,356 B2
(45) Date of Patent: Nov. 2, 2004

(54) METHOD AND SYSTEM IN A TELEPHONE EXCHANGE SYSTEM

(75) Inventors: Jari Kuvaja, Espoo (FI); Sakari Molin, Järvenpää (FI); Sami Kilkkilä, Espoo (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 09/975,499

(22) Filed: Oct. 10, 2001

(65) Prior Publication Data

US 2002/0067830 A1 Jun. 6, 2002

Related U.S. Application Data

(63) Continuation of application No. PCT/FI00/00254, filed on Mar. 27, 2000.

(51) Int. Cl.$^7$ ................................. H04L 9/00
(52) U.S. Cl. ...................... 380/277; 380/270
(58) Field of Search ................ 380/277, 270, 380/257

(56) References Cited

U.S. PATENT DOCUMENTS

| | | |
|---|---|---|
| 4,972,472 A | 11/1990 | Brown et al. |
| 5,081,677 A | 1/1992 | Green et al. |
| 5,325,432 A | 6/1994 | Gardeck et al. |
| 6,097,817 A * | 8/2000 | Bilgic et al. ........... 380/270 |

FOREIGN PATENT DOCUMENTS

| | | |
|---|---|---|
| JP | 09319673 A | 12/1997 |
| WO | WO 99/13393 | 3/1999 |
| WO | WO 99/38288 | 7/1999 |

* cited by examiner

*Primary Examiner*—Kim Vu
*Assistant Examiner*—Thanhnga Truong
(74) *Attorney, Agent, or Firm*—Squire, Sanders & Dempsey, L.L.P.

(57) ABSTRACT

Method and system for updating an encryption key used for the encryption of a password in a telephone exchange system comprising a telephone exchange (LE), a maintenance center (SC), a first database (DB1) containing user-specific information, and a second database (DB2) containing the encryption methods used and the associated encryption keys. The user information contains data indicating the encryption key used last and the password encrypted using this encryption key. When the user is logging on in the system, the encryption key last used data is compared with the current encryption key data. If these differ, the user is identified by the password encrypted with the encryption key used last, and the encryption key last used data is updated with the current encryption key of the telephone exchange system, and the encrypted password is updated to make it consistent with the current encryption key.

7 Claims, 2 Drawing Sheets

METHOD AND SYSTEM IN A TELEPHONE EXCHANGE SYSTEM

Figure 1:
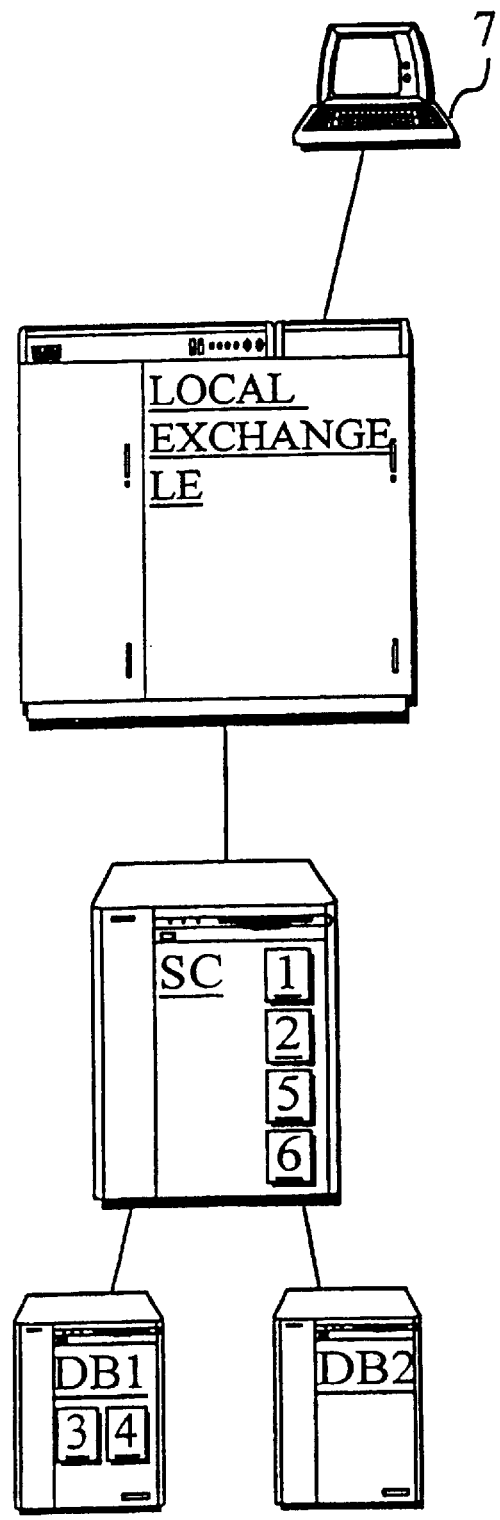

This application is a continuation of international application serial number PCT/FI00/00254, filed 27 Mar. 2000.

FIELD OF THE INVENTION

The present invention relates to telecommunication systems. In particular, the invention concerns a new type of method and system for updating an encryption key in a telephone exchange system.

BACKGROUND OF THE INVENTION

A telephone network traditionally consists of a plurality of separate telephone exchanges connected to each other via transmission lines. Further, subscribers are connected to telephone exchanges via various subscriber interfaces. An example of the telephone exchange is the DX 200 switching center manufactured by Nokia.

In the DX 200 switching system and in the associated user interface (Man Machine Interface, MMI), the authority and rights of a user who can e.g. give control commands to the various computer units in the switching center are determined on the basis of a user identification (User ID). For each user ID, an individual password for the authentication of the user has been defined. For the minimization of data security risks, it is necessary that the password be changed frequently enough to ensure that a person not authorized to use a user ID will not be able to utilize a user ID that does not belong to him/her. The password is generally stored in an encrypted form. In addition, the password can be assigned a maximum validity period.

To achieve a sufficient level of data security, the user must change his/her password from time to time. Data security can be further improved by regularly changing the encryption key used for the encryption of passwords in the system. However, changing the encryption key involves a problem. When the person maintaining the system changes the encryption key to be used in the system, he/she must change his/her own password at the same time. When the encryption key is changed, all passwords in the system become invalid. The passwords become invalid because they have been encrypted using an asymmetric encryption algorithm. The term 'asymmetric' means that it is not possible to restore the plain-language form of the password from its encrypted form. In this situation, the maintainer is the only person who has an encrypted password consistent with the new encryption key. This means that the maintainer would have to change the passwords of all users in conjunction with the introduction of a new encryption key.

The object of the present invention is to eliminate the drawbacks referred to above or at least to significantly alleviate them.

A specific object of the invention is to disclose a new type of method and system which will allow the updating of an encryption key used in a telephone exchange system to be automated while at the same time making the change of the encryption key used invisible to the users.

As for the features characteristic of the present invention, reference is made to the claims.

BRIEF DESCRIPTION OF THE INVENTION

The present invention concerns a method for updating the encryption key used for the encryption of a password in a telephone exchange system. The telephone exchange system comprises a telephone exchange, a maintenance center connected to the telephone exchange, a first database, which contains user-specific information, and a second database, which contains the encryption methods used in the telephone exchange system as well as the information and/or encryption keys associated with them. In addition, the first and second databases are connected to the maintenance center. The function of the maintenance center is to manage and monitor the operation of the network elements connected to it. The maintenance center may be a separate physical element or e.g. a logical functional unit physically integrated with another element.

In the method, data indicating, firstly, the encryption key last used in the telephone exchange system and, secondly, the password encrypted with this encryption key is written in the user-specific information contained in the first database. In the user-specific information, the encryption key data is placed e.g. in a separate field or distributed in several fields, in which case the encryption key data can be retrieved using e.g. a predetermined algorithm. The user information does not necessarily contain the encryption key as such, but only an index pointing to it. The encryption key itself may be stored elsewhere.

According to the method, the encryption key in use in the telephone exchange system is changed. The encryption key to be changed does not necessarily cover the entire telephone exchange system, but it may also be user and/or group-specific. The next time when the user logs on in the system after the change, the encryption key used last as indicated by the user-specific information is compared with the present encryption key data of the telephone exchange system. In this comparison, the parties compared are e.g. the encryption key index in the user-specific information and the encryption key index in use. If these encryption key data items do not differ from each other, then the encryption key data in the user information and the current encryption key data in the telephone exchange system are identical. If the encryption key data items differ from each other, then the user is identified by the encrypted password which has been encrypted with the encryption key used last as indicated by the user information. The encryption key used last is not necessarily the key preceding the current encryption key, because the user may not have logged on in the system at all between the previous changes of encryption keys.

If the user is successfully identified, then the data indicating the encryption key used last in the first database is updated with the current encryption key data of the telephone exchange system. Correspondingly, the encrypted password contained in the user information is updated into a form consistent with the current encryption key.

The system of the invention comprises the necessary means for implementing the operations occasioned by the updating of the encryption key.

The invention makes it possible to update encrypted passwords automatically in conjunction with a change of the encryption key. Therefore, the passwords need not be updated manually by the operator or any other party. A normal user will not become aware of the updating of the encryption key at all. At the same time, system maintenance becomes easier as the change of the password does not impair the security of the system or affect its performance.

LIST OF ILLUSTRATIONS

Figure 2:
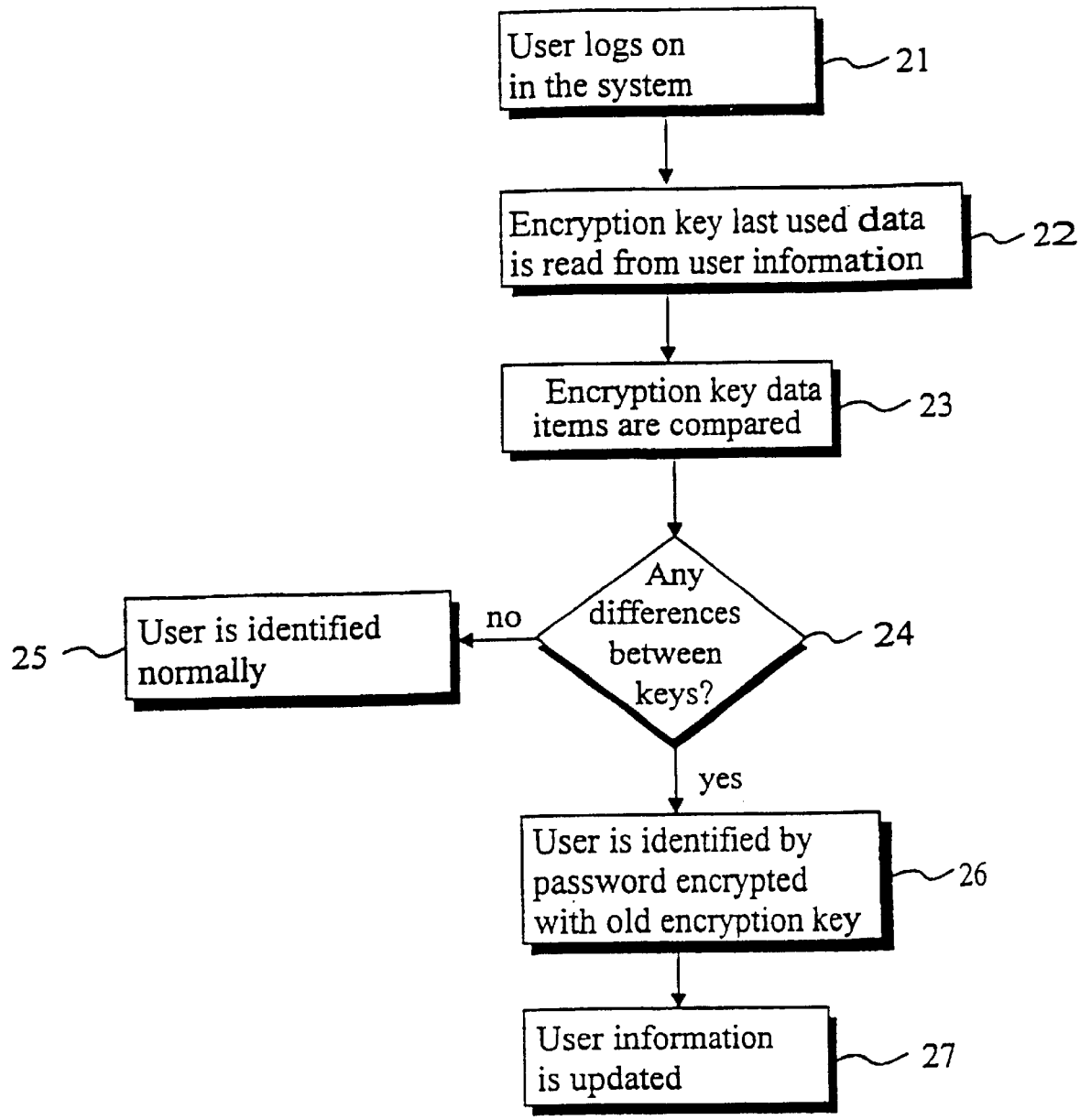

In the following, the invention will be described in detail by the aid of a few examples of its embodiments, wherein FIG. 1 presents a diagram representing a preferred system according to the invention, and FIG. 2 presents a functional block diagram according to the present invention.

DETAILED DESCRIPTION OF THE INVENTION

The system illustrated in FIG. 1 comprises a telephone exchange LE, a maintenance center SC connected to the telephone exchange LE, a first database DB1 connected to the maintenance center SC and a second database DB2 connected to the maintenance center SC. Moreover, the system presented in FIG. 1 comprises a workstation 7, which is used as a means of connecting to the telephone exchange system. The workstation may by an ordinary personal computer or equivalent, comprising a display and a keyboard, by means of which the user can interactively communicate with the telephone exchange system.

The maintenance center SC comprises means 1 for comparing the encryption key used last data included in the user information with the present encryption key data of the telephone exchange system when the user is logging on into the telephone exchange system and means 2 for identifying the user of the telephone exchange system by an encrypted password which has been encrypted with the encryption key used last as indicated by the user information. Furthermore, the maintenance center SC comprises means 5 for changing a user and/or group-specific encryption key and means 6 for denying the user access to the telephone exchange system if identification of the password fails.

The first database DB1 contains user or group-specific information. This information may contain e.g. an identifier of the encryption key in use in the telephone exchange system, the user identification of each user and the associated password in an encrypted form, and the encryption key identifier used in conjunction with the latest log-on of the user. The second database DB2 contains e.g. information and/or encryption keys associated with the encryption methods used in the telephone exchange system. In addition, the first database DB1 comprises means 3 for updating the encryption key last used data in the user information with the encryption key currently used in the telephone exchange system, and means 4 for updating the encrypted password contained in the user information so as to make it consistent with the current encryption key.

FIG. 2 presents a preferred method according to the invention in the form of a block diagram. The user logs on into the telephone exchange system by entering a user ID and a valid password corresponding to it, block 21. The user-specific information contains an indication of the encryption key used in conjunction with the previous log-on. As stated in block 22, that piece of information is read and compared with data indicating the encryption key currently in use in the telephone exchange system, block 23. If these encryption key data items do not differ from each other, block 24, then the user is identified in the normal manner by a password encrypted with the current encryption key, block 25.

If it is established that the encryption key data items differ from each other, block 24, then the user is identified on the basis of the encrypted password indicated by the user information, block 26. This password has been encrypted with the encryption key used last as indicated by the user information, which in this case differs from the encryption key currently used in the telephone exchange system. After successful identification, the user information is updated with the password encrypted using the new encryption key and with data indicating the encryption key used last in the telephone exchange system.

The invention is not restricted to the examples of its embodiments described above, but many variations are possible within the scope of the inventive idea defined in the claims.

What is claimed is:

1. Method for updating an encryption key used for the encryption of a password in a telephone exchange system comprising a telephone exchange;

a maintenance center connected to the telephone exchange;

a first database, which contains user-specific information and is connected to the maintenance center; and a second database, which is connected to the maintenance center and contains the encryption methods used in the telephone exchange system and the information and/or encryption keys associated with them, said method comprising the steps of:

writing in the user-specific information contained in the first database data indicating the encryption key used last as well as the password encrypted using this encryption key, changing in the maintenance center the encryption key to be used for the identification of users and/or encryption of information, log-on into the telephone exchange system is accomplished by supplying a user identification and a valid password corresponding to it, wherein the method comprises the steps of:

comparing the encryption key last used data indicated by the user information with the current encryption key data of the telephone exchange system when the user is logging on into the telephone exchange system, and if these encryption key data items differ from each other;

identifying the user of the telephone exchange system by the encrypted password which has been encrypted with the encryption key used last as indicated by the user information, and if the identification succeeds;

updating the encryption key last used data in the user information in the first database with the current encryption key of the telephone exchange system; and updating the encrypted password included in the user information in the first database so as to make it consistent with the current encryption key.

2. Method as defined in claim 1, wherein an encryption key which is user-specific or group-specific is changed in the telephone exchange system.

3. Method as defined in claim 1, wherein the user is denied access to the telephone exchange system if identification of the password fails.

4. Method as defined in claim 1, wherein the user of the telephone exchange system is identified normally if the encryption key last used data does not differ from the current encryption key data of the telephone exchange system.

5. System for updating an encryption key used for the encryption of a password in a telephone exchange system comprising a telephone exchange;

a maintenance center connected to the telephone exchange;

a first database, which contains user-specific information and is connected to the maintenance center; and a second database, which is connected to the maintenance center and contains the encryption methods used in the telephone exchange system and the information and/or encryption keys associated with them, wherein the system comprises:

means (1) for comparing the encryption key last used data indicated by the user information with the current encryption key data of the telephone exchange system when the user is logging on into the telephone exchange system;

means (2) for identifying the user of the telephone exchange system by the encrypted password which has been encrypted with the encryption key used last as indicated by the user information;

means (3) for updating the encryption key last used data in the user information in the first database with the current encryption key of the telephone exchange system; and means (4) for updating the encrypted password included in the user information in the first database so as to make it consistent with the current encryption key.

6. System as defined in claim 5, wherein the telephone exchange system comprises means (5) for changing a user and/or group-specific encryption key.

7. System as defined in claim 5, wherein the telephone exchange system comprises means (6) for denying the user access to the telephone exchange system if identification of the password fails.

* * * * *